(No Model.)
G. PALMER.
CAR WHEEL.
No. 366,602.  Patented July 12, 1887.
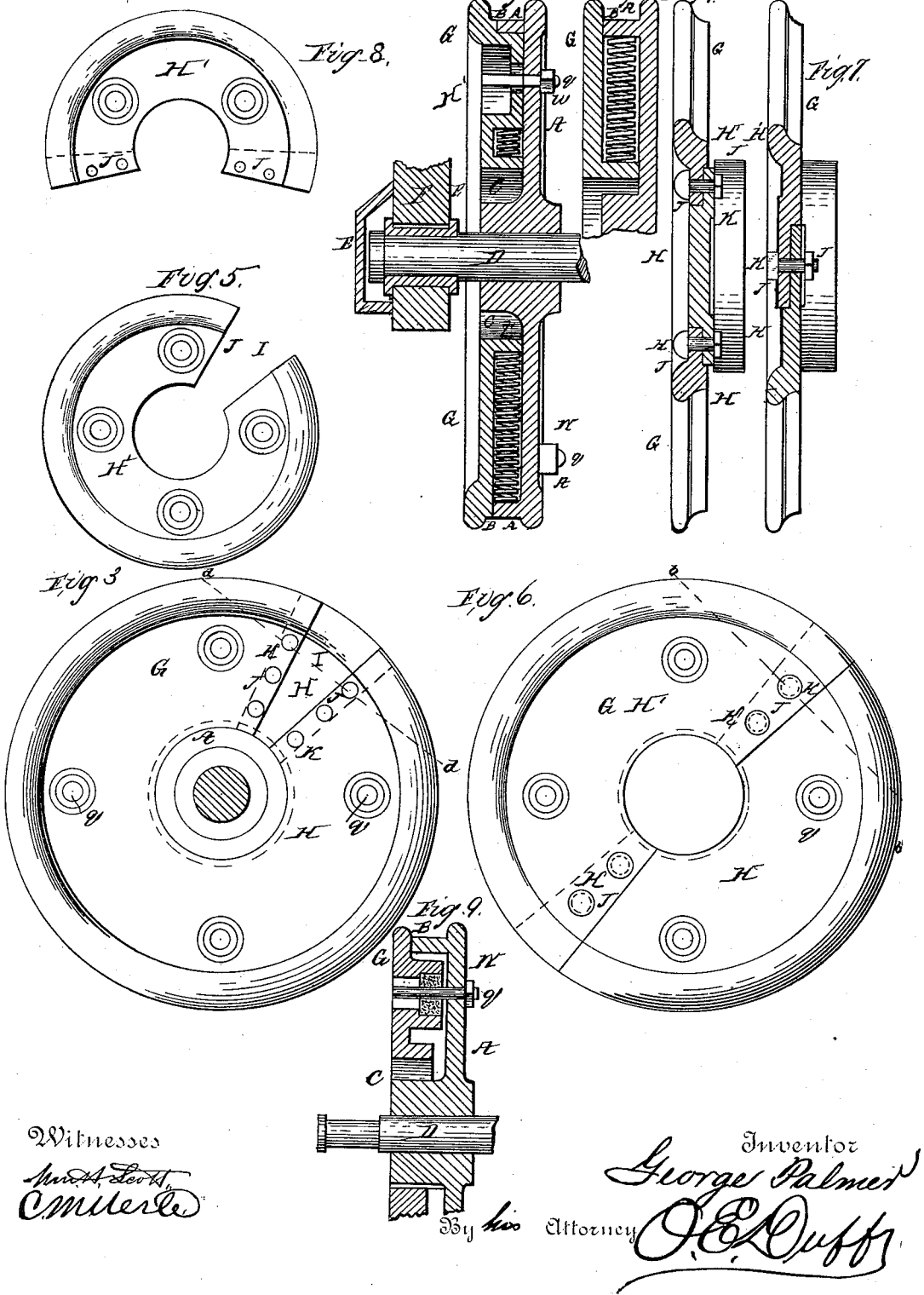
Witnesses
Inventor
George Palmer
By his Attorney

UNITED STATES PATENT OFFICE.

GEORGE PALMER, OF LITTLESTOWN, PENNSYLVANIA.

CAR-WHEEL.

SPECIFICATION forming part of Letters Patent No. 366,602, dated July 12, 1887.

Application filed March 18, 1887. Serial No. 231,468. (No model.)

*To all whom it may concern:*

Be it known that I, GEORGE PALMER, of Littlestown, in the county of Adams and State of Pennsylvania, have invented certain new and useful Improvements in Railway-Car Wheels; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to an improved construction of the auxiliary and yielding rail-guide flange of a railway-car wheel such as described in the Letters Patent granted to me and dated March 2, 1875, and numbered 160,462. In said patent, and also shown in Figure 1 of the drawings hereto annexed, said flange is constructed all of one piece, and in applying the same to wheels under the trucks on the track the wheel has to be taken off and parts detached in order to put on said auxiliary flange, as it has to be put on over the journal.

The object of this invention is to construct said flange with means for applying the same to car-wheels in present use or already attached to the truck of the car without removing the wheel or the extensive labor of taking apart the truck.

In the drawings annexed the different views are shown on different scales, Fig. 1 representing a diametrically-sectional portion of a car-wheel with an auxiliary guide-flange such as shown in the Patent No. 160,462, above referred to. Fig. 2 is a diametrically-bisected car-wheel mounted upon its axle, and showing the axle-box and the part of the truck to which the box is attached, and showing the auxiliary flange secured to the wheel, constructed according to my invention. Fig. 3 is a front view of a car-wheel with my auxiliary flange. Fig. 4 is a sectional edge view of the said flange detached, the line of section being shown in Fig. 3 at *a a*. Fig. 5 is a detached front view of the main part of said flange, the secondary part of the same being shown removed. Fig. 6 represents a detached front view of the auxiliary flange, the construction of the flange being modified from that above shown. Fig. 7 is a sectional edge view of the same, the section-line indicated by *b b* in Fig. 6. Fig. 8 is a detached front view of one part of the flange modified as shown by Fig. 6. Fig. 9 represents a cross-section of the flange, showing the socketed boss with the spring lining or cushion to retain the bolts in position and to prevent rattling or unnecessary lateral motion.

Figs. 1, 2, and 3 represent the car-wheel with its usual rail-guide flange formed and solid with the rim B of the wheel. C is the hub of said wheel, and D the axle upon which the wheel is mounted. E represents the axle-box, and F the part of the truck to which the axle-box is attached.

G represents the auxiliary yielding flange to which my improvement herein described particularly relates. Said flange is provided to yield and to be attached to the wheel, as described in said Patent No. 160,462. I construct said flange, instead, as shown by said patent, of one solid casting or piece, with a separate detached section, H, which is shown in Fig. 3 as being attached and in Fig. 5 shown entirely removed from the other or main portion, H', of said flange. The section H' is formed with a segmental portion, I, from its inner hub to its outer periphery entirely removed, as shown in Fig. 5, and the section H is a segmental-shaped section of the dimension to take the place of the removed portion I. The nearly radial meeting ends of the section H and H' are formed each with a lip, J, to lap over the other, and fitted over one another with a proper joint, as shown in Figs. 4 and 7; and to secure said sections firmly together I employ, through proper corresponding holes and through the jointed lip J, suitable strong rivets or bolts, K. The segmental dimension of either part H and H' may be, as preferred, larger or smaller, or they may be of equal dimension, as shown in Figs. 6, 7, and 8; but in all cases when attached together they form the complete circular flange, to answer practically all the use of the solid auxiliary flange, except that they are provided to be detached from one another for the purpose above mentioned—*i. e.*, to apply the flange to wheels under mounted trucks.

By my improved construction of the auxiliary flange, the proper holes for the bolts *q*, which hold the flange G to the wheel A, are drilled very readily without removing any part of the car-truck, and the portion H' is located in front of the rim of the car-wheel. The part H is now arranged to register with its lips J properly for the bolt or rivet holes. The bolts or rivets are now inserted and driven home, or they may be screwed to their normal position, by means of which the flange G is completed and made rigid as one piece, which is then, with the spring $t$, inserted in the wheel. The bolts $q$ are now placed in the holes which are drilled in the wheel and in those corresponding in the flange, and are finally furnished with their nuts $w$, which, after being screwed home, secure the flange properly with the wheel. The flange will yield to any irregularity when the wheel strikes frogs or switches, so that when the track is in good working condition it is of no disadvantage whatever; but the advantages are many, as the flange often prevents the spreading of the track, as well as to prevent the car running off therefrom, which is really the gist of my invention.

What I claim as my invention, and desire to secure by Letters Patent, is—

1. The combination, with a car-wheel, of an auxiliary yielding flange provided with a segmental detachable section, whereby the said section may be applied to the wheel without being removed from the frame or truck, substantially as described.

2. The combination, in a yielding detachable flange for car-wheels, consisting of two or more sections, said sections having projecting flanges forming a cup for the reception of elastic bearings to prevent undue lateral play of the bolts, substantially as set forth.

In testimony that I claim the foregoing as my own I affix my signature in presence of two witnesses.

GEORGE PALMER.

Witnesses:
JULIUS SOLGER,
O. E. DUFFY.